April 23, 1968  F. M. RONCI  3,379,154

METHOD OF MAKING A CLOSURE CAP

Filed Aug. 30, 1965  2 Sheets—Sheet 1

*INVENTOR.*
FERNANDO M. RONCI
BY
*Max Schwartz*
ATTORNEY

April 23, 1968 F. M. RONCI 3,379,154

METHOD OF MAKING A CLOSURE CAP

Filed Aug. 30, 1965 2 Sheets-Sheet 2

*INVENTOR.*
FERNANDO M. RONCI
BY
*Max Schwartz*
ATTORNEY

United States Patent Office 3,379,154
Patented Apr. 23, 1968

3,379,154
METHOD OF MAKING A CLOSURE CAP
Fernando M. Ronci, 584 Pleasant Valley Parkway,
Providence, R.I. 02908
Filed Aug. 30, 1965, Ser. No. 483,757
20 Claims. (Cl. 113—121)

My present invention relates to closure caps and more particularly to a novel method of manufacture of a closure cap having a formed cushion seal therein.

The principal object of the present invention is to provide a novel method of manufacturing closure caps in mass production in large quantities, each cap having a plastic seal formed therein and bonded thereto.

A further object of the present invention is to provide a closure cap with a bonded plastic seal which is readily punched from sheet stock in large quantities.

A further object of the present invention is to provide a novel method of manufacture which can be varied to suit different requirements in the manufacture of closure caps.

Another object of the present invention is to provide a novel method of manufacture which results in a closure cap having a bonded seal around the periphery where the closure cap contacts the perimeter of a container opening.

A further object of the present invention is to provide a novel method of manufacture which greatly reduces the cost of manufacturing closure caps having bonded plastic seals.

With the above and other objects and advantageous features in view my invention consists of a novel method of manufacture more fully disclosed in the detailed description following, in conjunction with the accompanying drawings, and more particularly defined in the appended claims.

Closure caps are normally made of metal and are provided in a flat body portion having a depending crimped skirt which is adapted to be bent into contact with the neck of a bottle or similar container. Such caps are conventionally used in extremely large quantities and are provided with sealing pads made of cork or other suitable material for sealing the cap on to the container and acting as a separator between the contents of the container and the metal of the closure cap. It has recently been proposed to utilize some of the new plastic materials instead of the separate cork sealing pad. Furthermore, the plastic material can be bonded to the inside of the closure cap making it easy to handle and transmit without the loss of the inner seal.

Closure caps with bonded plastic seals have been manufactured by various methods. Such methods have heretofore been found to be costly and to slow up the manufacture of the caps which are used in extremely large quantity. The methods of the present invention are designed to provide a means of manufacturing such closure caps in large quantities at comparatively low cost.

To begin with the cap is usually made of a steel or similar metallic material which is usually tin plated and may be primed in advance. However, the metal is provided in coils of large width and are fed through a punch press which stamps out large quantities of the caps at high speed. In accordance with the present invention and the method illustrated in FIGS. 1 to 4 inclusive, the metal can be fed through a succession of operating station similar to a printing press so that the final stamping provides a finished closure cap and its bonded sealer in completed form. This ensures that the finished cap can be formed as fast as the stamping press can operate.

In accordance with the present invention a strip of suitable material 10 is first primed on both sides in any conventional manner. This primer may be lacquer, enamel, or a phenolic type or vinyl type primer. The primed metal is now run through the printing rolls which prints the advertising material with a plurality of rows on the outside of the metal or rather that portion of the metal forming the outside of the cap. This printing is in accordance with the conventional practice.

Figure 1:
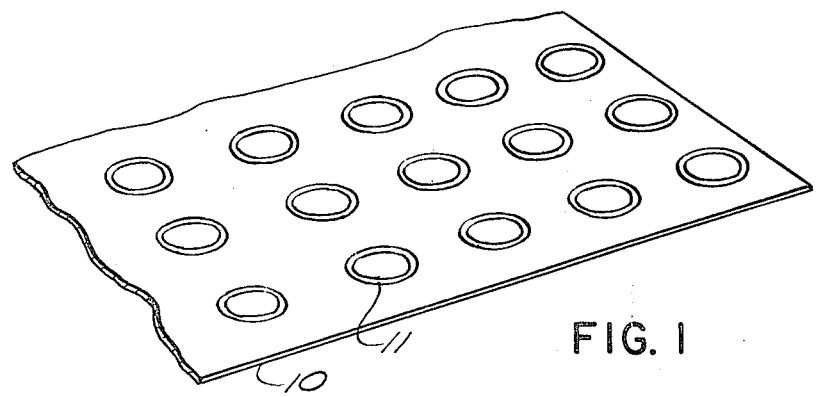
FIG. 1 is a perspective view of a fragment of sheet metal illustrating one step in the novel method of the present invention.
Figure 2:
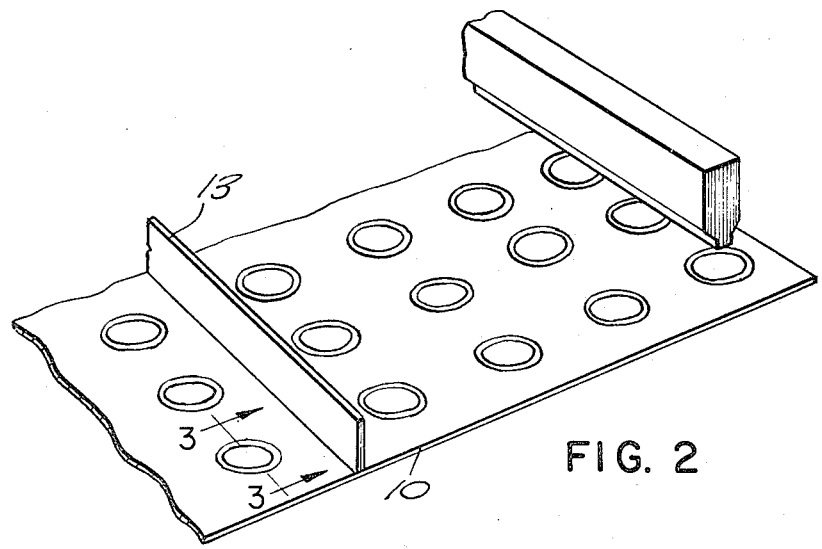
FIG. 2 is a view similar to FIG. 1 illustrating another step in the method of manufacture.
Figure 3:
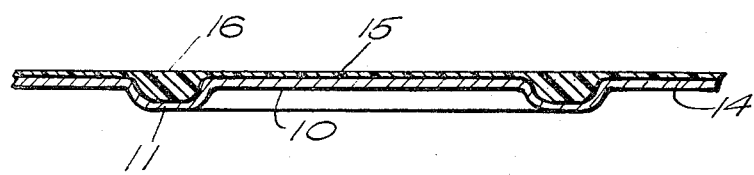
FIG. 3 is an enlarged section taken along line 3—3 on FIG. 2.

The next step is illustrated in FIG. 1. I now punch out a plurality of annular grooves 11 on the traveling sheet of metallic material. Each annular groove 11 is punched over a printed spot on the sheet and is designed to form the inside of the closure member. The next step, see FIG. 2, is the spreading of the plastic sealing material on the traveling sheet, as by means of a spreading device 12 and a doctor blade 13. This is also done as the sheet of metal moves along. By adjusting the pressure of the doctor blade 13 the thickness of the coat can be controlled. As can be seen in FIG. 3 the finished result is a strip of metal 10 having a priming coat 14 and a thin coat of plastic material 15 which fills the annular grooves 11 to form thicker sections 16.

Figure 4:
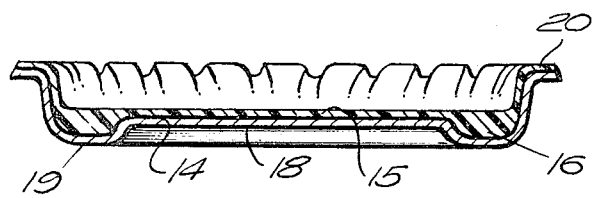
FIG. 4 is a transverse section of a finished closure cap made by the method illustrated in FIGS. 1 to 3 inclusive.

The strip of metal 10 is now run through the conventional stamping press which stamps out the finished closure cap illustrated in FIG. 4. The finished cap 17 is thus provided with a flat annular central portion 18 having a peripheral groove 19 extending around it from which the crimped skirt portion 20 extends. The inside of the metal is provided with a priming coat 14 and the thin coat of plastic material 15 and a thicker coat 16 filling the grooves 19.

The method of the present invention thus comprises the steps of first priming both sides of a continuous metal sheet, printing the necessary indicia on the outside portion of the metal, punching out a plurality of annular grooves in the metal, spreading the plastic material on the metal so that it is bonded thereto and then punching out the finished closure cap. As can readily be seen this method permits extremely rapid manufacture of large quantities of closure caps with the sealing plastic material already bonded thereto. The old method required the punching of the cap and the insertion of the cork seal. Therefore, the method of the present invention eliminates the assembly of the cork seal and the metal cap and permits the finished product to come out of the stamping press. Therefore, besides resulting in a far superior product, the method of the present invention permits manufacture of the improved product in large quantities at comparatively low cost.

Figure 5:
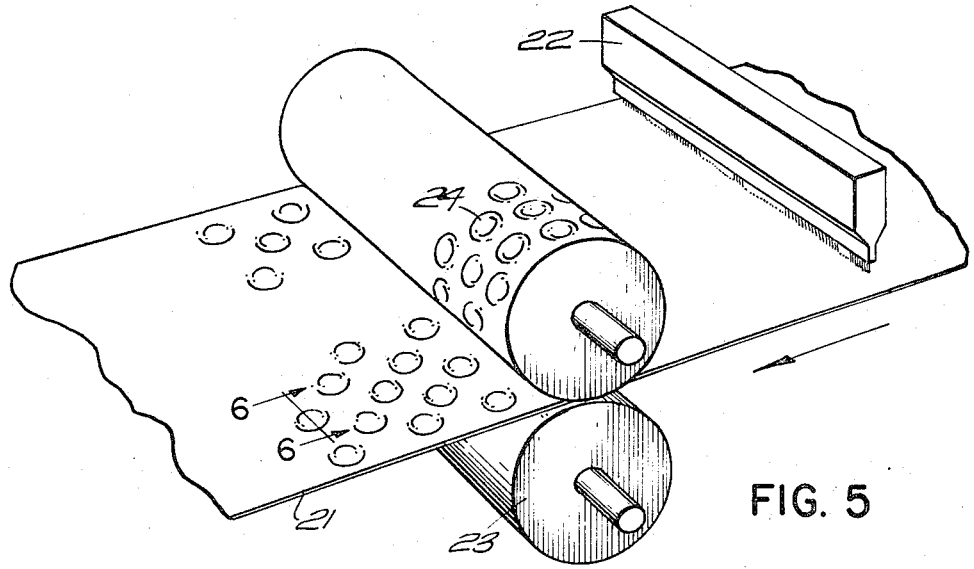
FIG. 5 is a perspective view of a portion of metal strip illustrating another method of manufacture.

FIGS. 5 to 8 inclusive illustrate a variation of the method illustrated in FIGS. 1 to 4 inclusive. By this method the punching step illustrated in FIG. 1 is eliminated. The method of manufacture proceeds as follows:

First the metal is primed on both sides. This is identical with the form illustrated in FIG. 1. Then the strip is printed on the outside portion of the metal. This is also in accordance with the previous method. Now as illustrated in FIG. 5, the primed and printed metal strip 21 is coated with a layer of plastic material as by the illustrated doctor blade 22 and then passed between rollers 23. The rollers 23 are provided with annular indented grooves 24 which bunch up the plastic material into the annular rings 25.

Figure 6:
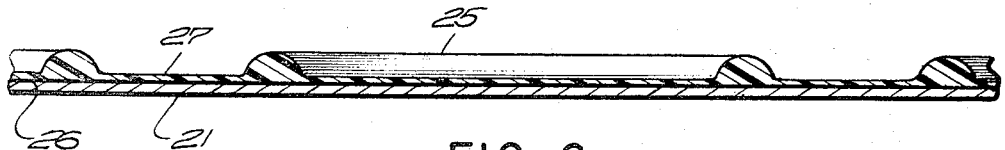
FIG. 6 is an enlarged section taken on line 6—6 on FIG. 5.
Figure 7:
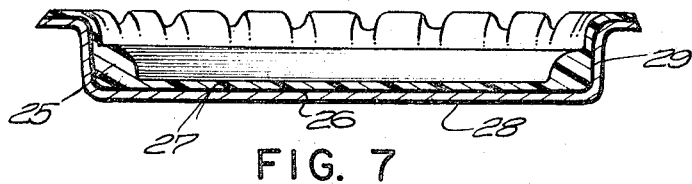
FIG. 7 is an enlarged transverse section of a finished closure cap made by the method illustrated in FIGS. 5 and 6.
Figure 8:
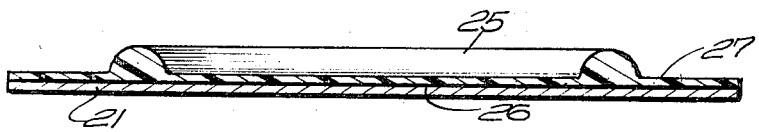
FIG. 8 is a transverse section of a blank piece punched from the strip illustrated in FIG. 5 for making the cap illustrated in FIG. 7.

As can be seen in FIG. 6, the metal sheet 21 now constitutes a priming coat 26 and a thin coat of plastic material 27 on which is bonded the annular thickened groove portions 25. The press now chops out a segment of this material as illustrated in FIG. 8 and forms it into the finished closure cap illustrated in FIG. 7. This closure cap is provided with a straight bottom or crown portion 28 and the crimped skirts 29 depending from the perimeter thereof. The central portion of the crown portion 28 is provided with a thin coat of plastic material 27 and the thickened annular part 25 lays in the corner between the crown portion 28 and skirt 29 where it will rest on the lip of the bottle to form the necessary seal.

Thus this method of manufacture also permits the finished closure member to be stamped from the press with the plastic seal bonded to it in advance. Therefore, the form illustrated in FIGS. 1 to 4 inclusive provides the metal with an annular groove into which the thickened portion can be laid while the form illustrated in FIGS. 5 to 8 forms the thickened portion on top of the flat metal. Both forms greatly increase the speed of manufacture and allow the stamping press to come out with a finished product on which no further operations are necessary.

In some constructions it may be desirable to use a foam rubber or plastic to provide a soft seal to take care of irregularities in the bottle rim caused by chipping. Since such foam plastics leak, an aluminum foil facing is applied thereto. This can be done by applying the foil to the prepared metal sheet after the operation illustrated in FIG. 2. The finished cap will be as in FIG. 4 with the sheet of aluminum foil covering the seal. Other advantages of the present invention will be readily apparent to a person skilled in the art.

I claim:

1. The method of manufacturing a closure cap which comprises punching a plurality of annular grooves in a sheet of metal stock, depositing a predetermined amount of sealer material on said sheet, spreading said material over said sheet to form a thin coat covering said sheet and to fill said grooves, and stamping a finished closure member from said sheet at each of said grooves whereby each closure member has a central body portion with a peripheral groove and an integral depending skirt portion, said sealing material coating the interior of said closure member and filling said groove.

2. The method as in claim 1, wherein said sealing material is a plastic material.

3. The method as in claim 1, wherein said sealing material is bonded to said closure cap.

4. The method as in claim 1, wherein said sheet of metal stock is coated on both sides with a plastic priming coat prior to the punching of the grooves.

5. The method as in claim 1, wherein said sheet of metal stock is printed on the back thereof prior to the punching of the grooves.

6. The method as in claim 2, wherein said sealing material is bonded to said closure cap.

7. The method as in claim 2, wherein said sheet of metal stock is coated on both sides with a plastic priming coat prior to the punching of the grooves.

8. The method as in claim 3, wherein said sheet of metal stock is coated on both sides with a plastic priming coat prior to the punching of the grooves.

9. The method as in claim 6, wherein said sheet of metal stock is coated on both sides with a plastic priming coat prior to the punching of the grooves.

10. The method as in claim 2, wherein said sheet of metal stock is printed on the back thereof prior to the punching of the grooves.

11. The method as in claim 3, wherein said sheet of metal stock is printed on the back thereof prior to the punching of the grooves.

12. The method as in claim 4, wherein said sheet of metal stock is printed on the back thereof after addition of the priming coat and before the punching of the grooves.

13. The method as in claim 6, wherein said sheet of metal stock is printed on the back thereof prior to the punching of the grooves.

14. The method as in claim 7, wherein said sheet of metal stock is printed on the back thereof after addition of the priming coat and before the punching of the grooves.

15. The method as in claim 8, wherein said sheet of metal stock is printed on the back thereof after addition of the priming coat and before the punching of the grooves.

16. The method as in claim 9, wherein said sheet of metal stock is printed on the back thereof after addition of the priming coat and before the punching of the grooves.

17. The method of manufacturing a closure cap which comprises spreading a layer of sealing material over a sheet of metal stock, squeezing said sheet and layer to form a plurality of annular thickened rings of sealer material on said sheet, punching out said sheet around each of said rings, and forming a finished closure cap having a base and depending skirt with the interior covered with a layer of sealer material and a thickened annular ring of sealer material at the periphery of said base.

18. The method as in claim 17, wherein said sealing material comprises a plastic material bonded to said sheet of metal stock.

19. The method as in claim 17, wherein said metal stock is coated on both sides with a priming coat before the application of the sealing material.

20. The method as in claim 19, wherein said sealing material and said priming coat comprise plastic materials bonded to said sheet of metal stock.

References Cited

UNITED STATES PATENTS

| | | | |
|---|---|---|---|
| 2,392,238 | 1/1946 | Fankhanel | 113—80 |
| 3,295,486 | 1/1967 | Simons et al. | 113—121 |
| 3,327,665 | 6/1967 | Miller | 113—80 |

CHARLES W. LANHAM, *Primary Examiner.*

R. D. GREFE, *Examiner.*